Patented Aug. 21, 1945

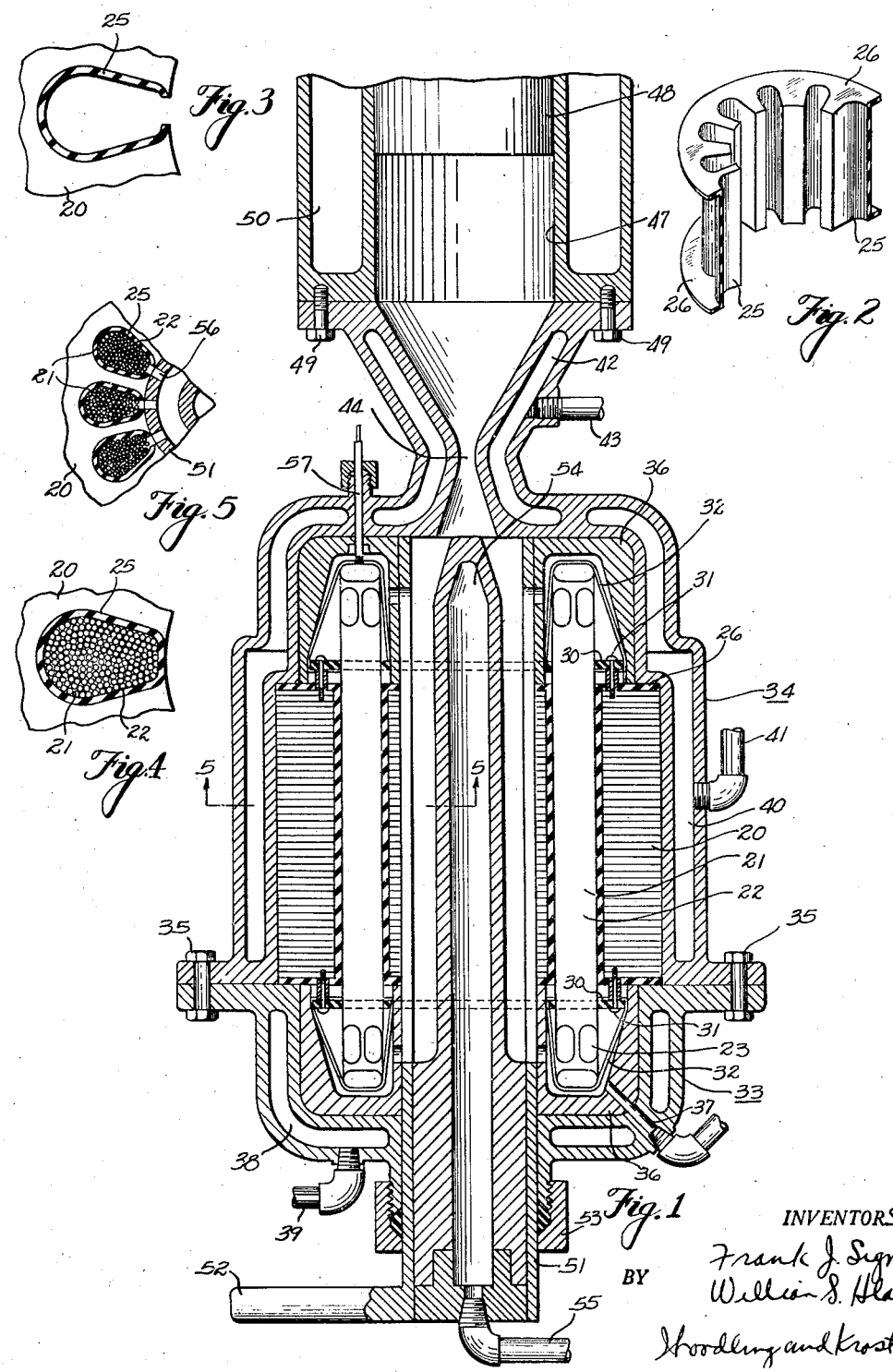

2,383,019

UNITED STATES PATENT OFFICE 2,383,019

WINDING ELEMENT

Frank J. Sigmund and William S. Hlavin, Cleveland, Ohio, assignors, by mesne assignments, to Sigmund Corporation, a corporation of Ohio Application June 4, 1943, Serial No. 489,614

4 Claims. (Cl. 171—252)

Our invention relates in general to winding elements for a dynamo-electric machine and more particularly to liquid-tight winding elements which may be submerged in liquid or operated at high speeds and voltages and which will withstand a great deal of vibration without damage, and constitutes an improvement over our application Serial No. 450,240, filed July 9, 1942, for Liquid-tight stator.

The term "liquid-tight" refers to the fact that the winding elements have been made tight by the use of rubber-like material or other similar material which may be formed about the winding elements to render the winding elements water-proof, dust-proof, insulation-proof and vibration-proof.

An object of our invention is the provision of forming or molding rubber-like material about the windings of a dynamo-electric machine to render them liquid-tight.

Another object of our invention is the provision of embedding the windings of a dynamo-electric machine in a mass of rubber-like material which is relatively flexible and which will not crack or be damaged by the expansion and contraction of the magnetizable core incident to changes in temperature.

Another object of our invention is the provision of anchoring the windings to the magnetizable core prior to introducing a mass of rubber-like material about the windings.

Another object of our invention is to cover or coat the surface of the slots of the magnetizable core with a rubber-like material to eliminate the air-pockets on one side, and to cover the top and bottom heads of the windings, the free spaces between the windings on the other side, and to form complete vibration and water-proof elements.

Another object of our invention is to coat the entire coil sides and coil heads with rubber-like material.

Other objects and a fuller understanding of our invention may be had by referring to the accompanying description and claims, taken in conjunction with the drawing, in which:

Figure 1 is a cross-sectional view of a stator taken in conjunction with molding dies employed to mold or form the rubber-like material about the windings of the stator;

Figure 2 is a cross-sectional view showing substantially one-half of a rubber-like pre-formed sheet of material arranged to fit over the slots and the ends of the magnetizable core;

Figure 3 is a fragmentary and cross-sectional view taken through one of the slots after the sheet of material shown in Figure 2 has been applied to the magnetizable core;

Figure 4 is a fragmentary and cross-sectional view of a slot after the windings have been molded in the rubber-like material; and Figure 5 is a cross-sectional and fragmentary view of Figure 1 taken along the line 5—5 thereof.

With reference to Figure 1 which shows a cross-sectional view of a stator taken in conjunction with forming dies preparatory to forming the rubber-like material about the windings of the stator to make a liquid-tight stator which may be operated under water or other liquid, the magnetizable core is identified by the reference character 20 which carries windings 21 comprising a plurality of coils positioned in the longitudinal slots thereof. The portion of the coils which lie within the slots may be designated as coil sides and the portion of the coils which extend beyond the ends of the magnetizable core 20 may be designated as coil heads. In the drawing, the coil sides are indicated by the reference character 22 and the coil heads by the reference character 23. The laminations of the magnetizable core 20 may be held together in any suitable manner.

Prior to inserting the coil sides in the slots of the magnetizable core, I provide for covering the walls of the slot with a pre-formed sheet of rubber-like material which is indicated by the reference character 25. The pre-formed sheet of rubber-like material 25 may be substantially the same as that shown and described in our pending application Serial No. 488,170, filed May 24, 1943 for Pre-formed coating for magnetizable core. The end flanges 26 of the preformed sheet of material 25 fits flat against the ends of the magnetizable core. The pre-formed sheet of material is shown in Figure 2 and the portion which fits over the teeth is removed so that the air gap may be maintained to a minimum. Instead of using a pre-formed sheet of rubber-like material 25 as shown in Figure 2, the rubber-like material may be applied to the magnetizable core by dipping the core in a container having a supply of rubber-like material such as shown and described in application Serial No. 482,710, filed April 12, 1943 for Magnetizable core. In our invention, the rubber-like material includes a variety of substances in which the predominate part may comprise polymers of vinyl compounds, such as vinyl chloride, vinyl acetate, vinyl acetals and alcohols, and vinylidene chloride. It may further include mixtures and copolymers of the vinyl compounds.

We find that the compounds identified above give very good results, however, we do not want to be specifically confined to these compounds as our invention contemplates the use of any rubber-like material or synthetic rubber to produce the insulation with the necessary properties required for the service conditions. It is within the scope of our invention to choose the best rubber-like compound with distinctive qualities which make that compound the most suitable for the insulation such as: (1) low water absorption, (2) high electrical resistance, (3) great resistance to chemicals, including acids, alkalies, corrosives and gases, (4) good tensile strength, (5) easy to apply to the magnetizable core.

The softening point of the rubber-like material should be as high as possible, thus permitting the temperature of the motor to rise to a high value. The rubber-like plastics or their compounds have a wide range of temperature resistance and point of softening. Some begin to soften at 140° F., others at 200° F. or more. Other grades can be employed with a softening temperature higher than 200° F. and do not become brittle at hub-zero temperatures and which have high dielectric and high tensile strengths.

After the windings are inserted in the winding slots, they are anchored to the magnetizable core by means of an anchoring ring 30 and wrapping cord or tape 32. The anchoring ring 30 may be secured to the ends of the core by means of screws 31 which pass through spacers to hold the anchoring ring 30 a short distance from the end of the core. The wrapping cord or tape 32 is looped around the anchoring ring and over the coil heads 23. The anchoring ring and the wrapping cord or tape operate to hold the windings in the slots, and particularly prevents any relative longitudinal movement between the windings and the magnetizable core. The wrapping cord or tape 32 comprises many loops which extend completely around the annular heads of the coils.

After the windings are secured within the slots the next operation is to assemble the core and the windings within a mold comprising generally a lower part 33 and an upper part 34 held together by the bolts 35. Die blocks 36 are mounted within the molds and cover the coil heads with a space between the die blocks and the coil heads. A vacuum duct 37 extends through the lower mold part 33 and the die block 36 to extract air from the winding assembly which is to be filled with the rubber-like material. Mounted within the central opening of the stator core is a cylindrical valve sleeve 51 having a plurality of longitudinal slots 56 which may be aligned with the slots of the core to permit the rubber-like material to enter each of the winding slots and completely fill all of the free space around the winding. The cylindrical valve sleeve 51 may be rotated by a handle 52 to either cause the slots 56 to be aligned with the slots in the core or to permit the misalignment of the slots as requirements dictate. A packing nut 53 seals the cylindrical valve sleeve 51 with the lowermost portion of the lower mold part 33. As illustrated, the mold is provided with a plurality of fluid jackets to heat the rubber-like material during the process of ejecting the rubber-like material into the winding elements and to cool the rubber-like material after the material has been injected into the winding elements. The lower mold part 33 is provided with a fluid jacket 38 which has a duct 39 connected therewith for admitting heated liquid during the molding process or to admit cold liquid during the setting process. The upper mold part 34 has around its body portion a fluid jacket 40 and a duct 41 connected thereto. The uppermost portion of the upper mold 34 has a fluid jacket 42 and a duct 43 extending therefrom.

An ejecting piston 48 and a cylinder 47 are connected to the upper portion of the upper mold part 34 by means of bolts or screws 49. The cylinder 47 is provided with a fluid jacket 50 to heat the rubber-like material therein. Extending within the cylindrical valve sleeve 51 is a fluid jacket 54 having a duct 55 connected thereto.

In operation, the rubber-like material is provided or supplied to the cylinder 47 below the piston 48 and the cylindrical valve sleeve 51 is turned or adjusted by the handle 52 so that the slots 56 within the cylindrical valve sleeve 51 are in alignment with the slots of the core, see Figure 5. As the piston 48 is depressed, the rubber-like material is caused to flow downwardly through the orifice 44 and then into the cylindrical valve sleeve 51. As the rubber-like material flows downwardly, air may be exhausted through the vacuum duct 37. The rubber-like material fills all of the space about the coil sides within the slots and the coil head within the die blocks 36. Consequently, the rubber-like material forms a fluid-tight envelope about the coil sides and about the coil heads to render the winding elements water-proof, dust-proof, insulation-proof and vibration-proof. After the rubber-like material has completely filled all of the free space around the coil sides and the coil heads, the cylindrical valve sleeve 51 may be turned to blank all communication through the slot 56, the blanking occurring when the slots 56 are in alignment with the ends of the teeth of the core. The rubber-like material is heated to the proper temperature to enable it to flow freely through all of the free spaces around the windings to insure a complete water-tight job. The proper heating is controlled by determining the temperature of the fluid which enters the fluid jackets through their respective connecting ducts. After the windings are completely covered with the rubber-like material, the heated fluid may be removed from the fluid jackets, after which cool liquid may be caused to flow into the fluid jackets through the connected ducts for cooling and setting the rubber-like material. The cable 57 which extends from the windings has its lower end anchored in the rubber-like material which is formed around the coil heads so that a fluid-tight seal is provided where the cable enters the molded rubber-like material which surrounds the coil heads. The vacuum duct 37 also functions as an overflow for any excess rubber-like material which affords a signal that all of the free spaces about the winding are filled.

The rubber-like material which is molded around the windings may be of the same composition as that for the sleeve winding 25 hereinbefore identified. More specifically, the rubber-like material which is molded around the windings may comprise vinol insulating compound, for example, VM 1890 which may be defined as natural colored, heat stabilized copolymer of vinol chloride and vinol acetate, medium high viscosity resin plus 35 to 50 percent plasticizer.

Instead of employing the rubber-like sleeve within the slots of the core as hereinbefore illustrated, we may also employ the perforated sleeves as shown in our pending application Serial No. 450,240, filed July 9, 1942 for Liquid-tight stator. These perforated sleeves would centralize the windings in which event the rubber-like material would flow from the supply chamber 47 in and about the coil sides to completely fill the space between the coil sides and the slots. In other words, the perforated sleeves would hold the coil sides a spaced radial distance from the slots to provide for the rubber-like material in the cylinder to fill all of the space instead of employing the material 25 hereinbefore identified. One advantage of providing a sheet of rubber-like material over the slots as shown in Figure 2, is that the sheet shown in Figure 2 may be previously tested for leaks to insure that there is no likelihood of water leaking into the stator after it is once assembled.

Although we have described our invention with a certain degree of particularlity, it is understood that the present disclosure has been made only by way of example and that numerous changes in the details of construction and the combination and arrangement of parts may be resorted to without departing from the spirit and scope of the invention as hereinafter claimed.

We claim as our invention:

1. A liquid-tight element for a dynamo-electric machine comprising a magnetizable core having a plurality of winding slots, a winding comprising coils with coil sides in said slots and coil heads at the ends of the core, fluid-tight insulating coating means in the slots to substantially envelop the coil sides, anchoring means at the ends of the core and spaced therefrom, said anchoring means engaging and laterally supporting the coils, binding means tying the coil heads to the anchoring means for longitudinally supporting the coils, and a mass of fluid-tight insulating material in the slots comprising in conjunction with the fluid-tight insulating coating means a liquid-proof container about each coil side, said mass of fluid-tight insulating material terminating in an annular ring upon each end of the core and enclosing the coil heads to make a liquid-tight winding.

2. A method for constructing a liquid-tight element for a dynamo-electric machine comprising a magnetizable core having a plurality of winding slots and a winding comprising coils with coil sides in said slots and coil heads at the ends of the core, comprising the steps of providing fluid-tight insulating coating means in the slots to substantially envelop the coil sides, anchoring the coils to the core to support the coils against both lateral and longitudinal movement, and introducing a mass of fluid-tight insulating material in the slots which in conjunction with the fluid-tight insulating coating means provides a liquid-proof container about each coil side.

3. A method for constructing a liquid-tight element for a dynamo-electric machine comprising a magnetizable core having a plurality of winding slots and a winding comprising coils with coil sides in said slots and coil heads at the ends of the core, comprising the steps of providing fluid-tight insulating coating means in the slots to substantially envelop the coil sides, anchoring the coils to the core to support the coils against both lateral and longitudinal movement, introducing a mass of fluid-tight insulating material in the slots which in conjunction with the fluid-tight insulating coating means provides a liquid-proof container about each coil side, and applying a mass of fluid-tight insulating material to the coil heads to render them liquid-tight.

4. A liquid-tight element for a dynamo-electric machine comprising a magnetizable core having a plurality of winding slots, a winding comprising coils with coil sides in said slots and coil heads at the ends of the core, anchoring means at the end of the core and spaced therefrom, said anchoring means engaging and laterally supporting the coils, binding means tying the coil heads to the anchoring means for longitudinally supporting the coils, and a mass of fluid-tight insulating material in the slots for enveloping the coil sides to constitute a liquid-proof container about each coil side, said mass of fluid-tight insulating material terminating in an annular ring upon each end of the core and enclosing the coil heads to make a liquid-tight winding.

FRANK J. SIGMUND.
WILLIAM S. HLAVIN.